UNITED STATES PATENT OFFICE.

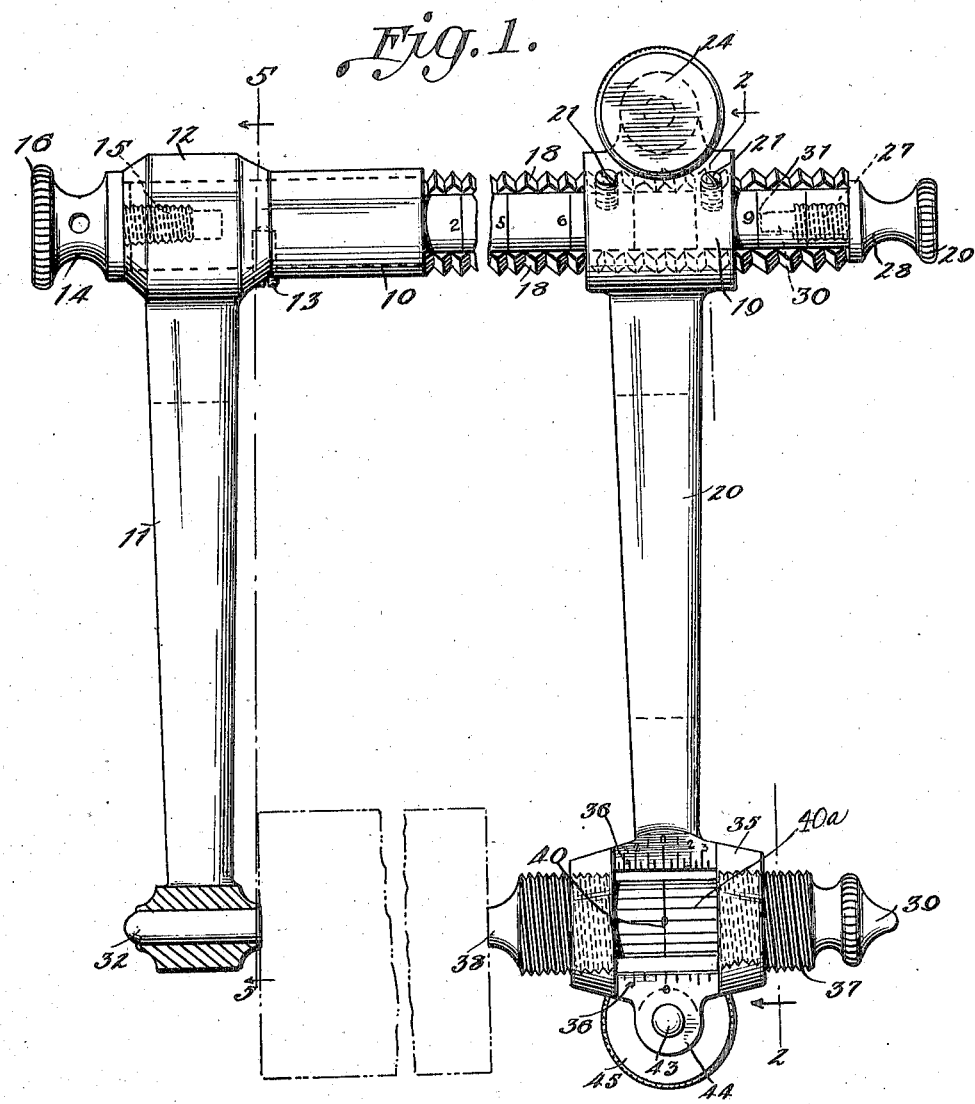
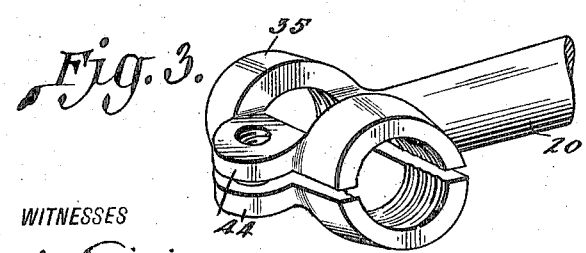

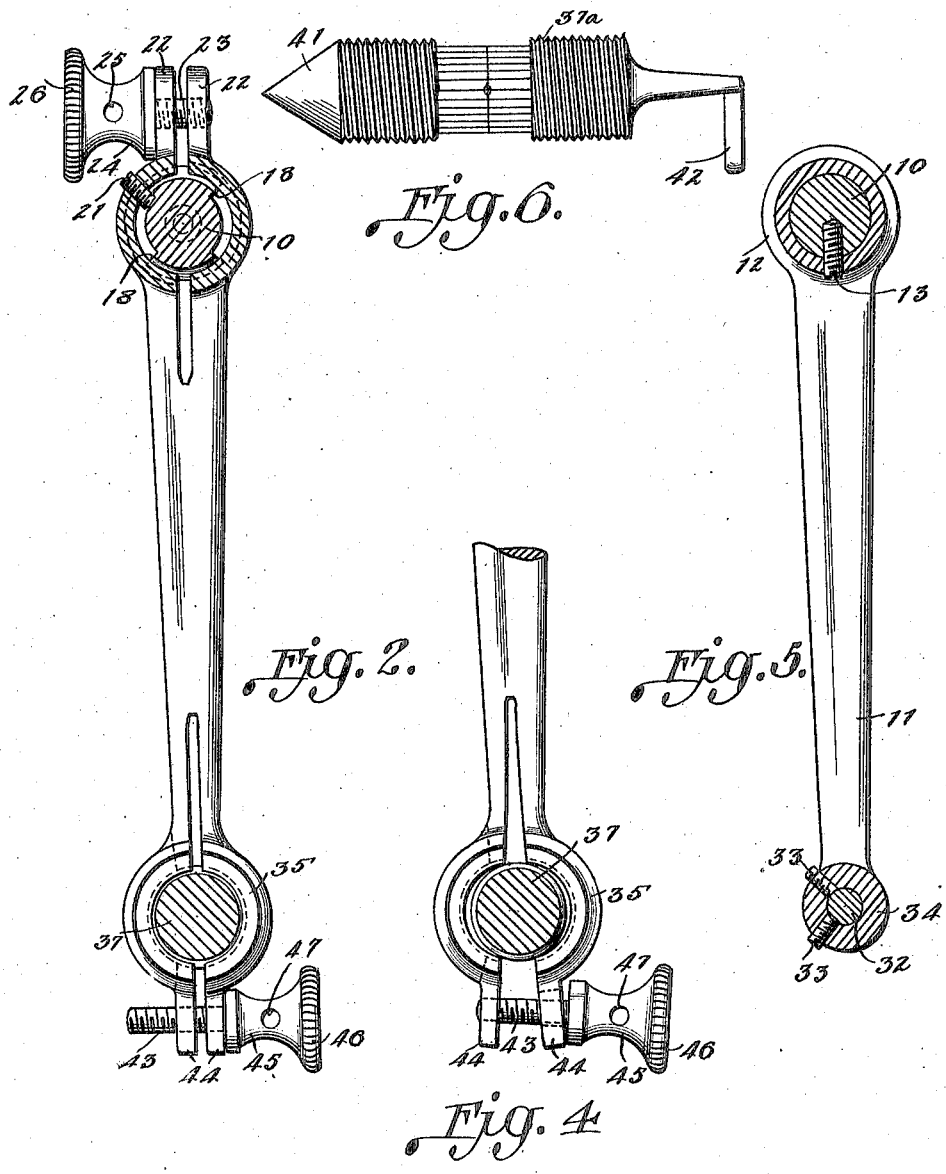

GEORGE COUSINS, OF OSWEGO, NEW YORK.

MICROMETER-CALIPER.

1,393,266.  Specification of Letters Patent.  Patented Oct. 11, 1921.

Application filed December 10, 1919. Serial No. 343,738.

*To all whom it may concern:*

Be it known that I, GEORGE COUSINS, a citizen of the United States, and a resident of Oswego, in the county of Oswego and State of New York, have invented certain new and useful Improvements in Micrometer-Calipers, of which the following is a specification.

My present invention relates generally to micrometer calipers and more particularly to a readily adjustable easy reading arrangement of this character which will obviate the necessity for a vernier, and which will permit of convenient easy interchange of spindles for different classes of work.

In carrying out my invention, I provide an apparatus in which the various portions are detachably connected in a novel, effective way so as to facilitate their removal for purposes of substitution and repair, as well as to render adjustments or movements of the movable parts simple and easy of manipulation.

In the accompanying drawing illustrating my present invention,

Figure 1 is a front elevation,

Fig. 2 is a vertical transverse section taken on line 2—2 of Fig. 1,

Fig. 3 is a detail perspective view of one end of the adjustable leg.

Fig. 4 is a view similar to the lower portion of Fig. 2, showing the clamp of the adjustable leg in released position to permit of removal of the micrometer screw, Fig. 5 is a vertical transverse section taken substantially on line 5—5 of Fig. 1, and Fig. 6 is a detail side view of a different micrometer screw.

Referring now to these figures, I have shown a beam 10, one end of which is reduced to receive the enlarged tubular end of a caliper leg 11, the said enlarged tubular end 12 of which leg is held in place on the beam by means of a set screw 13 which effectively prevents rotative movement and by means of a clamping member 14, the reduced screw 15 of which threads axially into the adjacent end of the beam 10. This clamping member 14 abuts the outer end of the tubular portion 12 of leg 11 and has an outer knurled head 16 and an opening 17 by means of which a rod or the like may be passed through its shank in order to rotate the same into effectively snug uniform engagement with the leg end 12.

The remaining portion of the beam 10 has mutilated threads, which form a rack-like construction, the threaded portion 18 of the rack being disposed at diametrically opposite points thereof to coöperate with the diametrically opposed threaded portions of the tubular end 19 of the movable caliper leg 20, the latter of which is rotatable within the limits of movement of set screws 21 extending through portions thereof with their inner ends engaging the reduced sides of the beam 10 between its threads 18 so that the movable leg may be rotated slightly with respect to the beam and the threads disengaged to permit of free sliding movement of the movable leg on the beam. The set screws 21 are so positioned, however, as to engage with one of the threaded portions 18 of the beam when the axis of the outer end of the movable leg 20 alines with the axis of the outer stationary leg 11.

The outer portion of the tubular end 19 is, moreover, split and provided with threaded bearings 22 for an adjusting screw 23 as best seen in Fig. 2, the shank 24 of which screw has a transverse opening 25 and a milled head 26, so that by loosening the screw, the movable leg may be readily detached from the beam and in the ordinary operation of the device, wear of the parts may be readily taken up.

At the outer end of its threaded portion, the end of the beam 10 has an axial threaded opening for the reception of a screw 27 whose shank 28 normally prevents removal of the movable leg 20 and has a milled head 29, this screw being preferably provided with a reduced inner end 30 of a diameter adapting the same for coöperation with openings 17 and 25 of the screw shanks previously described, and also preferably having a screw driver-shaped extremity 31 adapted for coöperation with the set screws 13 and 21 previously described.

The outer end of the stationary leg 11 is of tubular form, its transverse opening being adapted for the reception of a hardened pin 32 which forms an anvil and which is removably secured by angularly disposed set screws 33 which as best seen in Fig. 5, work through portions of the tubular end 34 of the stationary leg to securely fasten the pin 32 in place, while permitting of its ready removal or adjustment or in case substitution becomes necessary or desirable.

The outer end of the movable leg 20 has a split tubular bearing 35 one side portion of which, between its ends is cut away, exposing its threaded bore between flat surfaces 36. This threaded bore receives a micrometer screw 37, the central portion of which is preferably reduced in diameter, and the opposite ends of which have article engaging extremities 38 and 39 of different form. At its center the screw 37 has a zero line 40 extending therearound arranged to coöperate with the zero point of micrometer scales upon the flat surfaces 36 previously described, and upon its reduced portion, the screw 37 has a series of circumferentially spaced parallel lines 40$^a$ lengthwise thereof which coöperate with the flat faces 36 in order to facilitate reading of the adjusted positions of the micrometer screw.

By virtue of this construction it is obvious the micrometer screw may be reversed and that several screws, like the screw 37, except as to the particular form of the article engaging extremity, may be utilized. Thus for instance, I have shown a micrometer screw 37$^a$ in Fig. 6, one end of which has a conical thread engaging extremity 41 and the opposite end of which may have an angular engaging piece 42 to extend within an opening to be gaged.

The bearing portion 35 of the adjustable leg 20 being split as previously described, a clamping or adjusting screw 43 is utilized through extension ears 44 of the bearing member and is provided with a shank 45 having a milled head 46 and a transverse opening 47, and thus by comparison of Figs. 2 and 4, it may be seen that by loosening the clamp screw 43, the micrometer screw may be readily withdrawn without rotation either for the reversal thereof or the substitution of the screw 37$^a$ or the like.

The beam 10 has a scale along its reduced side portions between its threads, and with the various threads at a definite pitch to the inch, it is readily to be seen that by simply summing up the scale indications on the beam and upon the calibrations of the flat faces 36 of the bearing member 35 together with the positions of the parallel lines of the micrometer screw in relation to these flat faces, the exact spacing between the engaging extremities of the screw and the inner end of the axial pin 32 may be readily ascertained.

My invention thus presents a caliper capable of ready convenient use, as well as one which is adjustable to various classes of work and one in which the parts may be readily disengaged for the purpose of repair or substitution, or adjustment.

I claim:—

1. A micrometer caliper comprising a beam, a pair of caliper legs, one of which is rigidly mounted in connection with the beam, and the other of which is adjustable on the beam, said movable leg having a threaded bearing at its free end, one side of which is cut away and calibrated, and a micrometer screw adjustable in the said bearing, and having indicating means for coöperation with the calibrations of the bearing exposed through the cutaway portion of the bearing, said bearing being split to permit of readily shifting the screw into and out of place, and clamping means normally holding the split portions in operative relation for adjusting movement of the screw.

2. A micrometer caliper comprising a beam, an anvil supporting leg rigidly connected to the beam in detachable relation at one end of the beam, an anvil supported thereby, a movable leg having a micrometer screw opposing the anvil, said beam and said movable leg having mutilated threads in engagement with one another when the screw and anvil are axially alined and said movable leg being partially rotatable with respect to the beam to dis-engage the mutilated threads and permit of adjustment of the movable leg independently of said threads.

3. A micrometer caliper comprising a beam, an anvil supporting leg rigidly connected to the beam in detachable relation at one end of the beam, an anvil supported thereby, a movable leg having a micrometer screw opposing the anvil, said beam and said movable leg having mutilated threads in engagement with one another when the screw and anvil are axially alined and said movable leg being partially rotatable with respect to the beam to disengage the mutilated threads and permit of adjustment of the movable leg independently of said threads, and means to limit rotative movement of the movable leg arranged to bring the screw and anvil into axial alinement at one limit of such movement.

GEORGE COUSINS.